(12) United States Patent
Zagelow et al.

(10) Patent No.: US 9,892,142 B2
(45) Date of Patent: *Feb. 13, 2018

(54) MAINTAINING INDEX DATA IN A DATABASE

(75) Inventors: Margaret Zagelow, Morgan Hill, CA (US); Curt L. Cotner, Gilroy, CA (US); John A. McPherson, Jr., San Jose, CA (US); Claus Kempfert, Altdorf (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 304 days.

This patent is subject to a terminal disclaimer.

(21) Appl. No.: 13/527,871

(22) Filed: Jun. 20, 2012

(65) Prior Publication Data

US 2012/0259824 A1 Oct. 11, 2012

Related U.S. Application Data

(63) Continuation of application No. 12/240,343, filed on Sep. 29, 2008, now Pat. No. 8,239,389.

(51) Int. Cl.
*G06F 17/30* (2006.01)
(52) U.S. Cl.
CPC .............. *G06F 17/30336* (2013.01)
(58) Field of Classification Search
CPC ......... G06F 17/30085; G06F 17/30176; G06F 17/30575
See application file for complete search history.

(56) References Cited

U.S. PATENT DOCUMENTS

| 5,832,484 | A | 11/1998 | Sankaran et al. |
| 5,937,414 | A * | 8/1999 | Souder et al. ............... 707/616 |
| 6,047,291 | A * | 4/2000 | Anderson et al. ............ 707/792 |
| 6,182,090 | B1 * | 1/2001 | Peairs .......................... 715/209 |
| 6,338,056 | B1 * | 1/2002 | Dessloch et al. ............. 707/711 |
| 6,691,123 | B1 | 2/2004 | Gulliksen |
| 7,028,022 | B1 * | 4/2006 | Lightstone et al. |
| 7,133,868 | B1 | 11/2006 | Ruest et al. |
| 7,272,589 | B1 * | 9/2007 | Guay et al. ................... 707/716 |
| 7,308,456 | B2 | 12/2007 | Friske et al. |
| 7,657,576 | B1 * | 2/2010 | Norcott .................. 707/999.202 |
| 7,702,614 | B1 * | 4/2010 | Shah ................. G06F 17/30678 707/739 |

(Continued)

OTHER PUBLICATIONS

Deelman, Ewa et al., "A Metadata Catalog Service for Data Intensive Applications," The Globus Project, www.globus.org, Information Sciences Institute, University of Southern California, 2003; 33 pages.

*Primary Examiner* — Grace Park
*Assistant Examiner* — Jessica N Le
(74) *Attorney, Agent, or Firm* — Toler Law Group, PC

(57) ABSTRACT

In a particular embodiment, a method includes storing, at a staging table of a database, a data update generated based on a transaction performed with respect to a data table that is associated with one or more indexes. Each index of the one or more indexes is maintained externally to the database. The method further includes maintaining the data update at the staging table at least until index update data is received at the database. The index update data represents a modification, based on the data update, to a particular index of the one or more the indexes.

17 Claims, 9 Drawing Sheets

(56) References Cited

U.S. PATENT DOCUMENTS

| | | | |
|---|---|---|---|
| 7,720,884 B1* | 5/2010 | Gandhi | G06F 17/30292 |
| | | | 707/804 |
| 7,756,873 B2* | 7/2010 | Gould et al. | 707/737 |
| 7,761,418 B2* | 7/2010 | Brown et al. | 707/622 |
| 8,161,051 B2* | 4/2012 | Kaku et al. | 707/741 |
| 2003/0046309 A1* | 3/2003 | McGrath | G06F 17/30412 |
| 2003/0105858 A1 | 6/2003 | Hogg et al. | |
| 2003/0182319 A1* | 9/2003 | Morrison | G06F 17/30578 |
| 2004/0049537 A1 | 3/2004 | Titmuss | |
| 2004/0133562 A1* | 7/2004 | Toong et al. | 707/3 |
| 2004/0215600 A1* | 10/2004 | Aridor | G06F 17/30235 |
| 2004/0230571 A1* | 11/2004 | Robertson | 707/3 |
| 2005/0108189 A1* | 5/2005 | Samsonov | 707/1 |
| 2005/0228728 A1* | 10/2005 | Stromquist | G06Q 40/12 |
| | | | 705/30 |
| 2006/0015490 A1* | 1/2006 | Denuit et al. | 707/4 |
| 2006/0074965 A1* | 4/2006 | Cunningham et al. | 707/102 |
| 2006/0129618 A1* | 6/2006 | Maier | 707/204 |
| 2006/0149767 A1 | 7/2006 | Kindsvogel et al. | |
| 2006/0178895 A1 | 8/2006 | Djellal et al. | |
| 2006/0206543 A1* | 9/2006 | Nishino | G06F 17/30321 |
| 2007/0179995 A1* | 8/2007 | Prahlad | G06F 17/30528 |
| 2007/0192372 A1 | 8/2007 | Bestgen et al. | |
| 2007/0206585 A1 | 9/2007 | Lee | |
| 2007/0283291 A1 | 12/2007 | Morris | |
| 2008/0059495 A1 | 3/2008 | Kiessig et al. | |
| 2008/0065707 A1* | 3/2008 | Iwasaki | G06F 3/0614 |
| 2008/0086449 A1* | 4/2008 | Matsuzawa | G06F 17/30377 |
| 2009/0074300 A1* | 3/2009 | Hull | G06F 17/30247 |
| | | | 382/209 |
| 2009/0210429 A1* | 8/2009 | Agrawal | G06F 17/30578 |
| 2010/0005151 A1* | 1/2010 | Gokhale | G06F 17/30286 |
| | | | 709/216 |
| 2010/0042641 A1* | 2/2010 | Kamalakantha | G06F 17/30557 |
| | | | 707/805 |

* cited by examiner

MAINTAINING INDEX DATA IN A DATABASE

I. CLAIM OF PRIORITY

This application is a continuation patent application of, and claims priority from, U.S. patent application Ser. No. 12/240,343 filed on Sep. 29, 2008 and entitled "Persisting External Index Data in a Database," which is incorporated by reference herein in its entirety for all purposes.

II. BACKGROUND

Relational database and other multi-dimensional databases enable flexible and powerful capabilities to sort, correlate, and analyze data. Relational databases store data in data tables. In a data table, data is stored in columns and rows that can be manipulated to provide flexible online analytical decision support. One or more columns and one or more rows may store text data. It may be desirable to enable users to search the text data stored in the database. To provide improved indexing and search performance, text data may be indexed in an inverse index or comparable data structure that is maintained by an index manager that stores the index separately from and external to the database.

However, when the index data is stored separately from the data, maintaining correspondence between the index data and the data it represents may be difficult in certain situations. For one example, if the index manager should become unavailable as a result of systems or data communications issues, transactions that update the database may not be reflected in the index, and the index will no longer be synchronized with the database. Moreover, if multiple index managers are maintained to accommodate search demand, the indices maintained by the multiple index managers may not be synchronized with each other, and may also not be synchronized with the database. The database may be periodically re-indexed by the index manager, but re-indexing may be time consuming and costly in computer resources.

III. BRIEF SUMMARY

Systems, methods, and computer program products are disclosed. In a particular embodiment, a method includes maintaining a database including a first data table that is configured to store data in a database format and a second data table that is configured to store index data. The index data represents an index of a first portion of the first data table, and the index maintained externally to the database by an index manager. The method also includes generating a data update representing a modification to the first data table and communicating the data update to the index manager. The method further includes receiving index update data from the index manager representing a modification to the index as a result of the data update and applying the index update data to the second data table.

In another particular embodiment, a system includes a processor and a memory accessible to the processor. The memory is configured to store data and program instructions and the processor is configured to maintain a database that includes a plurality of data tables. The plurality of data tables include a first data table having a first data portion that is configured to store first text data and a second data table configured to store master index data including first index data corresponding to the first data portion. The first index data is received from a first index manager via a network interface. The processor is also configured to communicate the first index data to a first index manager via the network interface to instruct the first index manager to create the first index from the first index data.

In another particular embodiment, a computer program product for maintaining external index data in a database is disclosed. The computer program product comprises a computer-readable storage medium having computer-executable program instructions embodied therewith. The computer-executable program instructions include first program instructions to maintain an index of text data of a table column, where the text data of the table column is maintained at a remote database. The computer-executable program instructions also include second program instructions to receive a text update reflecting a data update to the remote database. The computer-executable program instructions also include third program instructions to update the index to reflect the text update. The computer-executable program instructions also include fourth program instructions to send index update data in a serialized binary format at a master index table in the remote database.

In another particular embodiment, a computational component for use in directing a computing device to maintain a master copy of index data at a database that is indexed by an external index server is disclosed. The computational component includes encoded computing device instructions emanating from a tangible computer readable medium. The encoded computing device instructions are electronically accessible to the computing device for execution. The execution of the encoded computing device instructions causes the computing device to maintain a data table in a database in a database format and to maintain an index table in the database. The index table includes content of an index to the data table, and the index is maintained in a format that is different than the database format by an index manager that is external to the database. The execution of the encoded computing device instructions also causes the computing device to receive a transaction initiating a data update to the data table, to communicate the data update to the index manager, to receive index update data from the index manager, and to apply the index update data to the index table.

IV. BRIEF DESCRIPTION OF THE SEVERAL VIEWS OF THE DRAWINGS

V. DETAILED DESCRIPTION

A master copy of index data for an index of a data table in a database is maintained within the database itself. Even though the index may be generated and maintained by an index manager separate from a database manager, and the index data may be stored by the index manager in a data store external to the database, a copy of the index data is maintained in the database. As a result, if a data communications failure or another failure should occur that might result in the index becoming desynchronized from the database, the index can be resynchronized with the database without having to regenerate the index from the data table. Using the master copy of the index data stored in the database, a copy of the index can be synchronized to the master copy of the index data. Moreover, additional, synchronized copies of the index can be created from the master copy of the index data without investing time and computing resources in actually regenerating the index from the data table.

Figure 1:
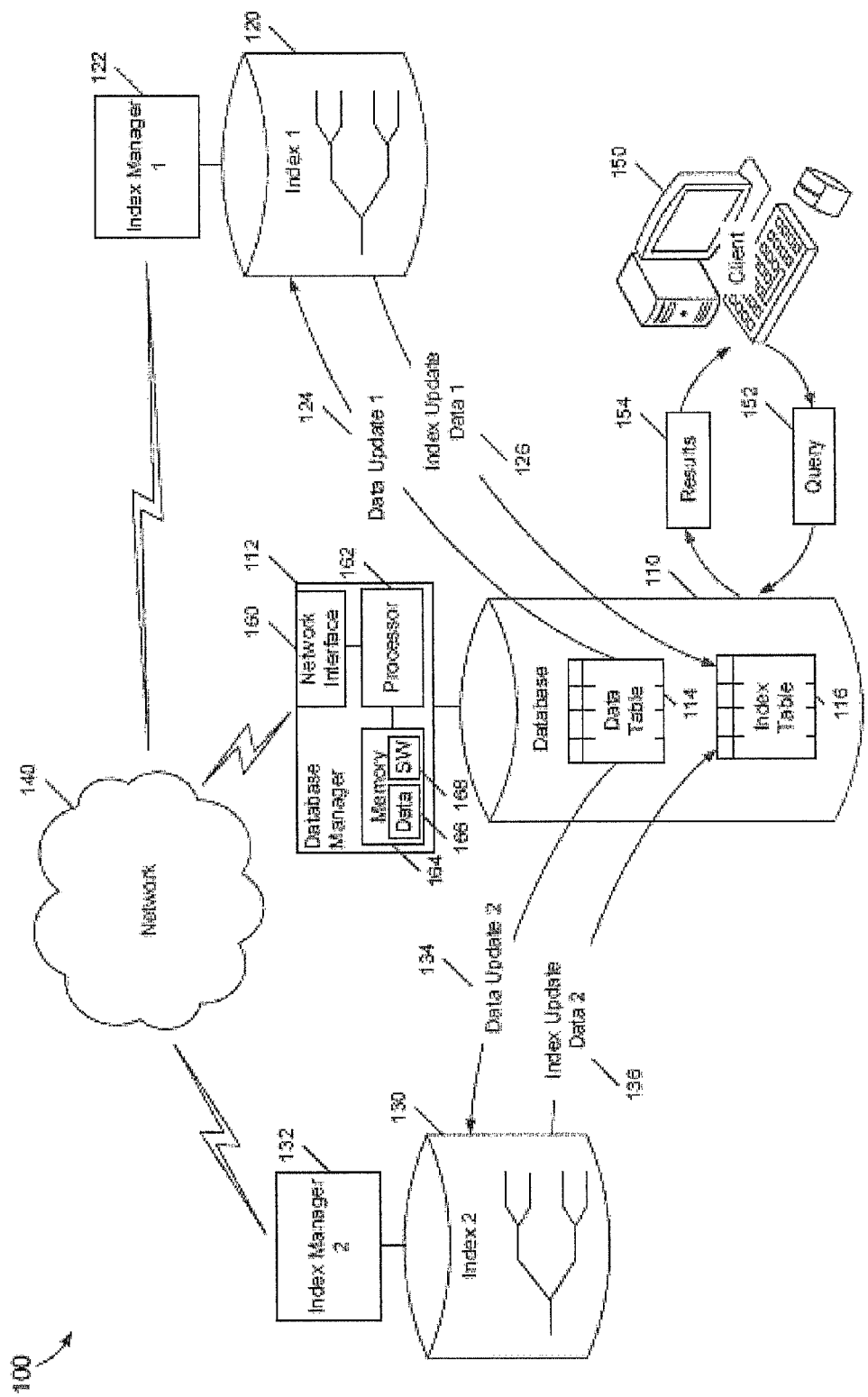
FIG. 1 is a diagram of a particular illustrative embodiment of a system to maintain index data in a database, where the index data represents content of an index maintained external to the database.

FIG. 1 is a diagram of a particular illustrative embodiment of a system, generally designated 100, for maintaining index data in a database 110 maintained by a database manager 112. The database manager 112 is in communication with a first index manager 122 via a network 140. The database manager 112 is also in communication with a second index manager 132 via the network 140. The first index manager 122 and the second index manager 132 are coupled to a first index 120 and a second index 130, respectively. A client 150 is in communication with the database 110, illustrated as sending query 152 to the database and receiving a result 154.

The database manager 112 includes a processor 162 coupled to a memory 164. A network interface 160 enables communications via the network 140. The memory 164 is configured to store data 166 and program instructions (SW) 168. The processor 162 is configured to enable the database manager 112 to maintain the database 110. In addition, the processor 162 is configured to receive requests from the index managers 122 and 132 and to communicate data and instructions to the index managers 122 and 132 via the network interface 160.

The database 110 includes one or more data tables 114 that maintain data. For purposes of this description, the term data will be used to represent data that includes substantive content of the database, whereas other types of data, such as index data that represents the content of the index to the database, will be designated accordingly. At least some of the data, including one or more rows or one or more columns of the data stored in the data table 114, may be text data. Text data may include names, locations, and other information expressible in a textual form that it may be desirable to index to allow users to search the text data. An index, such as the first index 120, may be generated and maintained by the first index manager 122 that communicates with the database manager 112 via the network 140. The first index 120 may be stored at a site local to the first index manager 122 to facilitate searches of the first index 120.

One or more additional copies of the index, such as the second index 130 may be generated, maintained, or operated, or some combination thereof, by another index manager at a location remote from the database 110, such as the second index manager 132. Alternatively, the second index 130 may maintain a separate index to a different aspect of the data stored in the data 114. For example, if the data in the data table 114 includes more than one portion including text data, an index to a first portion of text data may be maintained by the first index manager 122 in the first index 120 while an index to a second portion of text data may be maintained by the second index manager 132 in the second index 130. Depending on what text information a user wishes to search, a user may access either the first index 120 or the second index 130 via the first index manager 122 or the second index manager 132, respectively, to access the desired text data.

However, regardless of the location at which an index is generated, maintained, or operated, according to embodiments of the invention, a copy of index data included in the first index 120 or the second index 130 is stored in the database 110 in one or more index tables 116. The first index 120 may maintain data in an index format that is different than the data format used by the database 110 to store data. Therefore, the index data is stored in the index table 116 in a database format, such as a serialized binary format, so that the data and the index data are stored in the database 110, a common repository for both the data and the index data. Because both the data and the index data are stored in the database 110, time stamps or other mechanisms to correlate versions of the index data and the data may be avoided.

Put another way, in a particular illustrative embodiment both data and index data and stored in tables in the database 110, treating both the data and the index data as any other types of data that the database 110 maintains. The data table 114 may be regarded as a first data table configured to store data, at least a first portion of which includes first text data that will be used in indexing the data. The index table 116 may be regarded as a second data table configured to store the index data received from a first index manager such as the first index manager 122 via the network interface 160.

According to one particular embodiment, once a transaction changes content of the data table 114, as further described with reference to FIGS. 2-6, data indicating a change such as an addition or deletion of the data that is stored at the data table 114, referred to herein a data update, is generated. The data indicating a modification to the data at the data table 114, such as a first data update 124, is sent to the first index manager 122 so that the first index manager 122 can update the first index 120 to conform to the change in the data in the data table 114. Using the first data update 124, the first index manager 122 updates the first index 120. In addition, in accordance with embodiments of the invention, data reflecting the change in the first index 120 to account for the change in the content of the data table 114 is sent to the database manager 112, such as a first index update data 126, is sent to the database manager 112. Using the first index update data 126, the database manager 112 updates the index table 116 in the database 110. Thus, the database 110 maintains current copies of the data in the data table 114 and of the index data in the index table 116.

Correspondingly, if one or more additional copies of an index are maintained at additional locations, such as the second index manager 132 maintaining the second index 130 at a location remote from the database 110, upon occurrence of the transaction, the second data update 134 is sent to the second index manager 132 to update the second index 130. The second index manager 132 then sends second index update data 136 to the database manager 112 to update the index table 116. The second index update data 136 may be disregarded if the second index update data 136 is identical to the first index update data 126 when the first index update data 126 has been previously received. Alternatively, the first index update data 126 may be disregarded if the first index update data 126 is identical to the second index update data 136 when the second index update data 136 has been previously received.

To illustrate, during operation the processor 162 may be configured such that the database manager 112 can perform transactions and interact with one or more index managers to store a master copy of one or more externally-maintained indices. The database manager 112 may be configured to process a transaction resulting in a modification to a first data table, such as the data table 114. The data table 114 may contain a first data portion including first text data and a second data portion including second text data.

The database manager 112 may be configured to generate a data update representing the modification to first data portion of the data table 114 and to communicate the first data update 124 to the first index manager 122. As will be discussed with respect to FIGS. 2-6, the database manager 112 may maintain a staging table and, upon an occurrence of a triggering event, may communicate a data update to an index manager and maintain the data update in the staging table until index update data resulting from the data update is received from the index manager. The database manager 112 may be configured to receive the first index update data 126 from the first index manager 122 in response to the first data update 124 and to apply the first index update data 126 as an index update to a second data table, such as the index table 116, to generate updated master index data. The first index update data 126 may be received from the first index manager 122 in a database format, such as a serialized binary format.

Similarly, the database manager 112 may be configured to generate a data update representing the modification to second data portion of the data table 114 and to communicate the second data update 134 to the second index manager 132. The database manager 112 may receive the second index update data 136 from the second index manager 122 in response to the second data update 134 and apply the second index update data 136 as an index update to the index table 116, to generate updated master index data. The second index update data 136 may also be received from the second index manager 132 in the database format, such as the serialized binary format.

In a particular embodiment, the database manager 112 initiates all requests for the index managers 122 and 132. For example, the database manager 112 may send a request to the first index manager 122 and may receive an error message back from the first index manager 122. To illustrate, the first index manager 122 may experience a communication failure or an event that may compromise an integrity of the first index 120, such as a hardware failure or power-off event. In response to the error message from the first index manager 122, the database manager 112 may communicate to the second index manager 132 via the network interface 160 for the second index manager 132 to create the first index from the index table 116.

Figure 2:
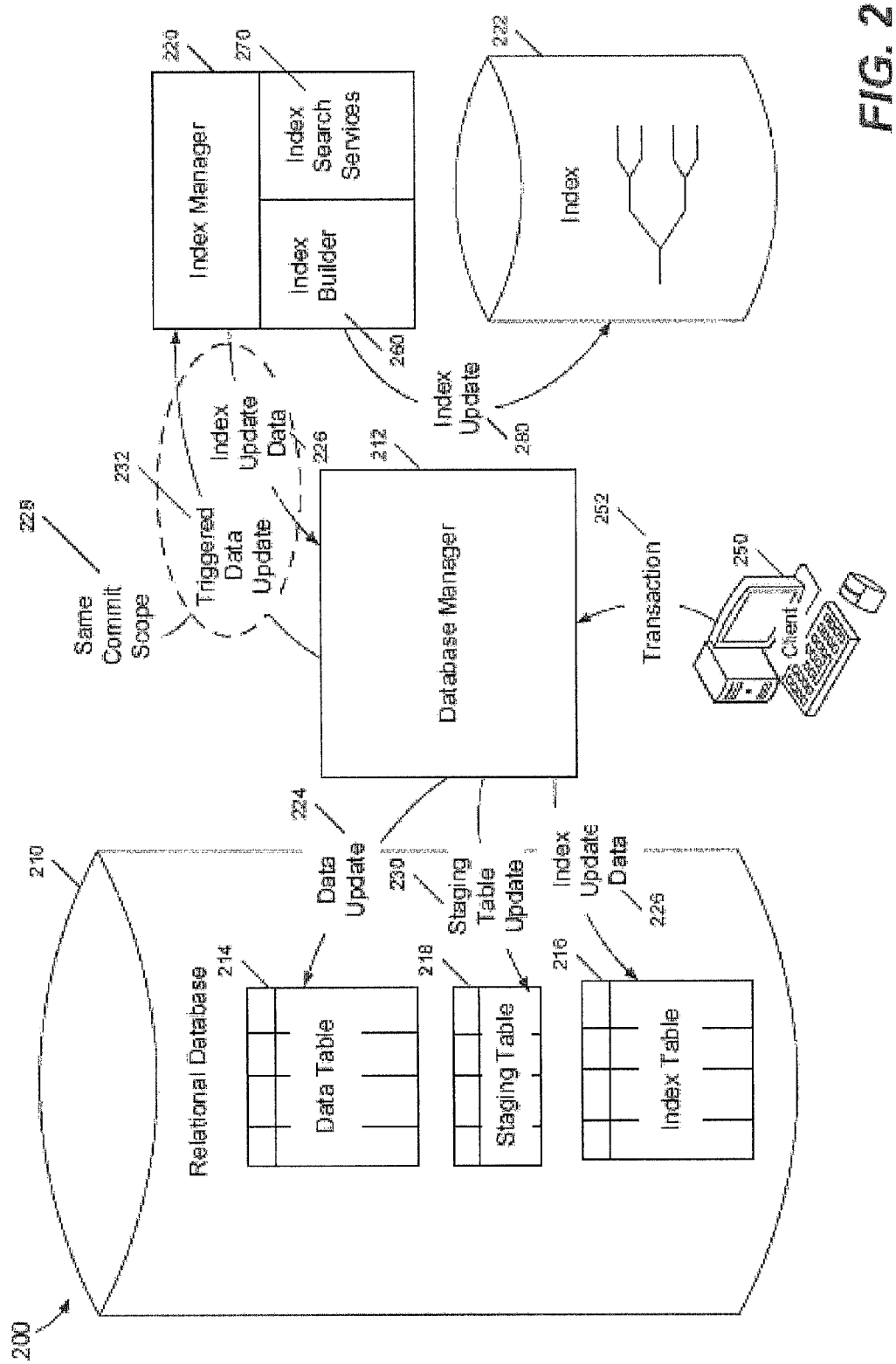
FIG. 2 is a diagram of a particular illustrative embodiment of a system depicting how a received transaction results in an update to a database, an update to an index external to the database, and an update to the index data maintained in the database.

FIG. 2 is a diagram of a particular illustrative embodiment of a system, generally designated 200, depicting how a received transaction results in an update to a database 210, an update to an index external to the database, and an update to the index data maintained in the database. In the example of FIG. 2, a client 250 (which may be under control of a human user or an automated system), generates a transaction 252 that will result in a change to the data stored in the data table 214 of the database 210. Specifically, the transaction 252 is received by the database manager 212 and presented to the database 210 as a data update 224. The data update 224 is applied to the data table 214. The update to the data table 214 may trigger a staging table update 230 where the data update 224 is also recorded at a staging table 218 of the database. A triggered data update 232 applies data updates stored in the staging table 218, such as the data update 224, to an external index 222 in response to an occurrence of a triggering event. The triggering event may include a synchronous timed update cycle, such as scheduled daily update, an asynchronous update signal, or any other type of event used to initiate the update. The triggering event may be associated with the receiving of index update data 226 or may be independent of receiving index update data 226. In one particular embodiment, irrespective of when the data update 224 is applied to the data table 214, the data update 224 is maintained in the staging table 218 at least until the index update data 226 is received The database manager 212, in addition to sending the data update 224 and the staging table update 230 to the database 210, also sends the triggered data update 232 to the index manager 220. For example, the database manager 212 may send the triggered data update 232 to the index manager 220 upon occurrence of the triggering event, as an index update that includes all entries stored at the staging table 218. The index manager 220 includes an index builder 260 configured to generate an index or an index update from data or from a triggered data update, respectively. The index manager 220 also includes index search services 270 to execute searches on an index 222. In response to the triggered data update 232, the index manager 220 causes the index builder 260 to generate an index update 280 reflecting a change to be made in the index 222 as a result of the triggered data update 232.

Index update data 226 is generated to represent the index update 280 applied to the index 222. In a particular illustrative embodiment, the index update data 280 is generated in a format used by the database 210, such as serialized binary data, enabling the index update data 226 to be readily added to a store of index data maintained by the database 210, such as an index table 216. The index update data 226 generated by the index manager 220 is stored in the index table 216 to update the index table 216 so that the content of the index table 216 corresponds to the content of the index 222. The index update data 226 may represent an incremental change to the index 222. In another embodiment, the index update data 226 may represent the entire index 222 after updating in response to the triggered data update 232.

In a particular illustrative embodiment, the triggered data update 232 and the index update data 226 are within the same commit scope 228. When a triggered data update 232 is communicated to the index manager 220 to update the index 222, the index update data 226 returned to the database manager 212 covers the same transaction or group of transactions to enable consistency between the content of the index 222 maintained by the index manager 220 and the index table 216 stored in the database 210.

On the other hand, the commit scope 228 of the triggered data update 232 and the index update data 226 may be different from a commit scope of an update to the data table 214. For example, multiple transactions may be applied to the data table 214 and stored in the staging table 218 before they are applied to the index 222 as the triggered data update 232, and may remain at the staging table 218 until the index update data 226 reflecting the changes maintained in the staging table 218 are applied to the index table 216. If, for some reason, index update data 226 were not received for a triggered data update 232, another update could be generated from data updates recorded at the staging table 218 to re-send to the index manager 220 to ensure the index 222 and the index data stored in the index table 216 correspond with one another.

Figure 3:
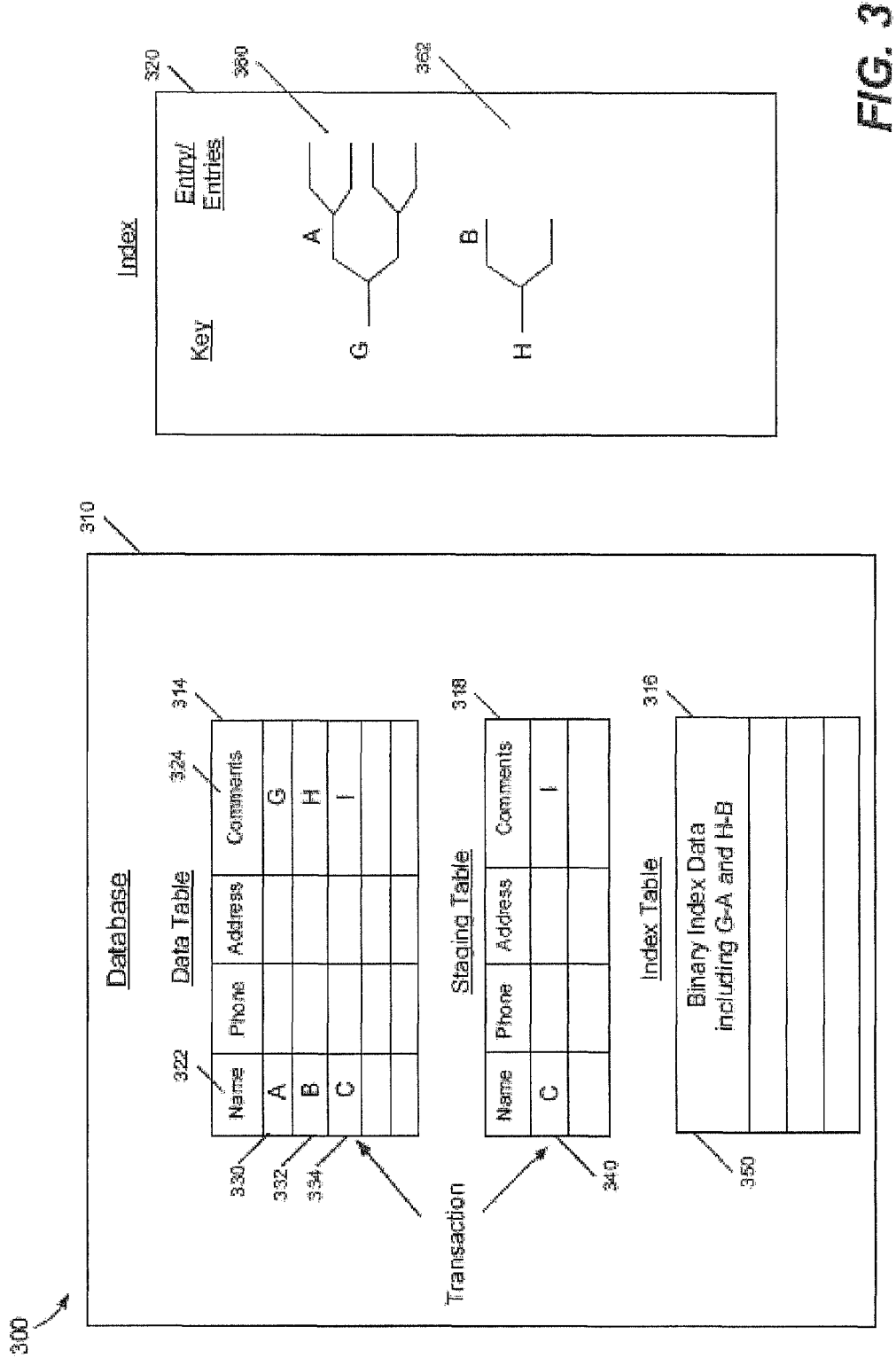
FIGS. 3-6 are diagrams of a particular illustrative embodiment illustrating an effect of a transaction on a data table storing data, a staging table storing updates to the data table, and an index table, and an index external the database.

FIG. 3 is a diagram of a particular illustrative embodiment of a system, generally designated 300, to illustrate operation of a data table storing data, a staging table storing updates to the data table, an index table storing index data, and an index external the database. In FIGS. 3-6, letters are used to represent text entries that might be included in an index. In FIG. 3, a data table 314 includes three entries: a first entry 330 for name A including a comment using a term G, a second entry 332 for name B including a comment using a term H, and a third entry 334 for name C including a comment using a term I.

A staging table 318 includes an entry for the name C 340 including the comment using a term I. A transaction for name C that has been applied to the data table 314 and the staging table 318 may have occurred after one or more prior updates of an index 320 so that the entry for the name C 340 is the only entry at the staging table 318.

An index table 316 includes an entry 350 that includes binary index data representing the index 320 that includes data in a database format associating term G to name A and also associating term H to name B. In a particular embodiment, the entry 350 is serialized binary data received from the index 320 in response to an earlier index update triggered by a triggering event.

Figure 4:
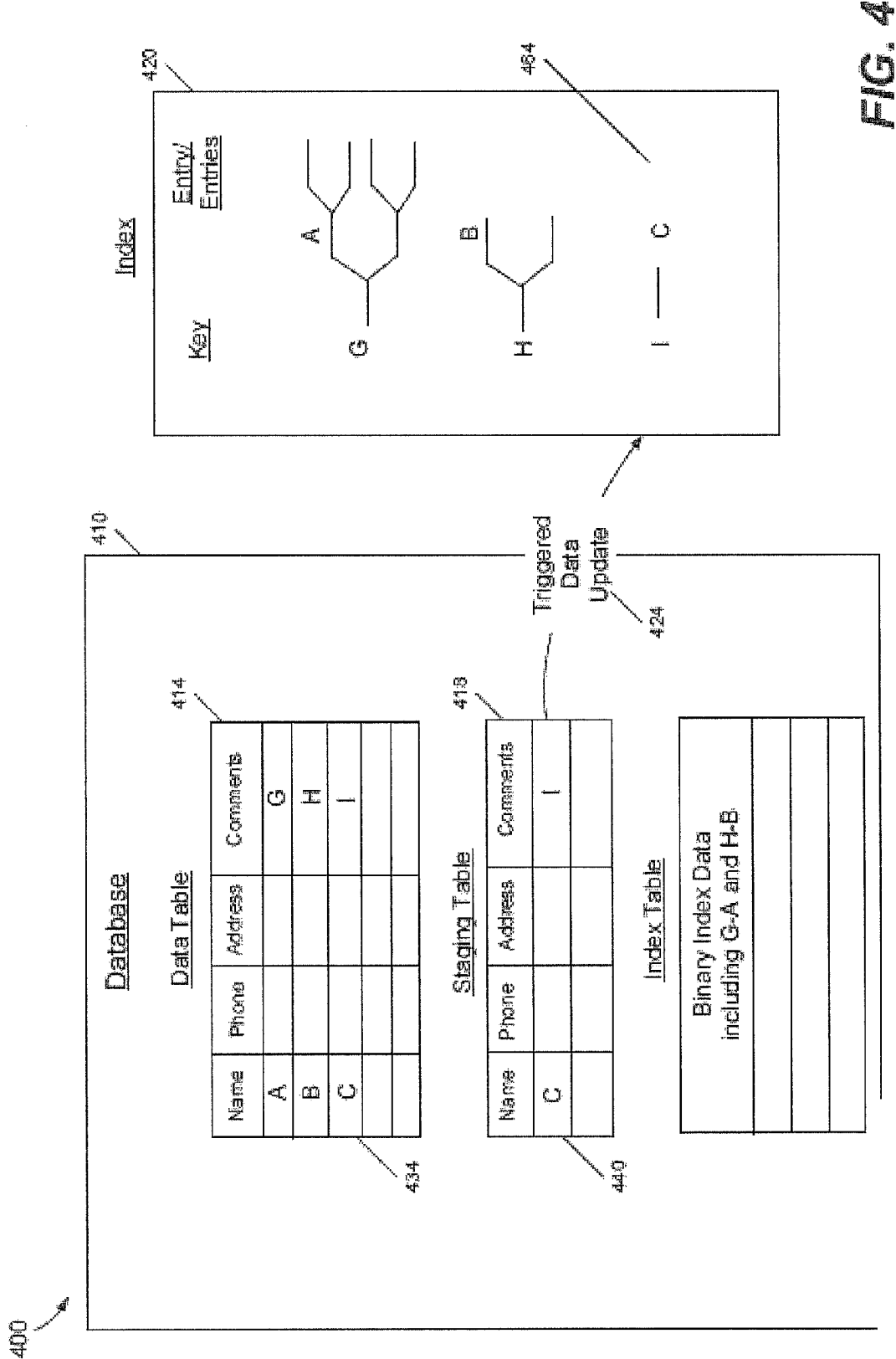
Figure 5:
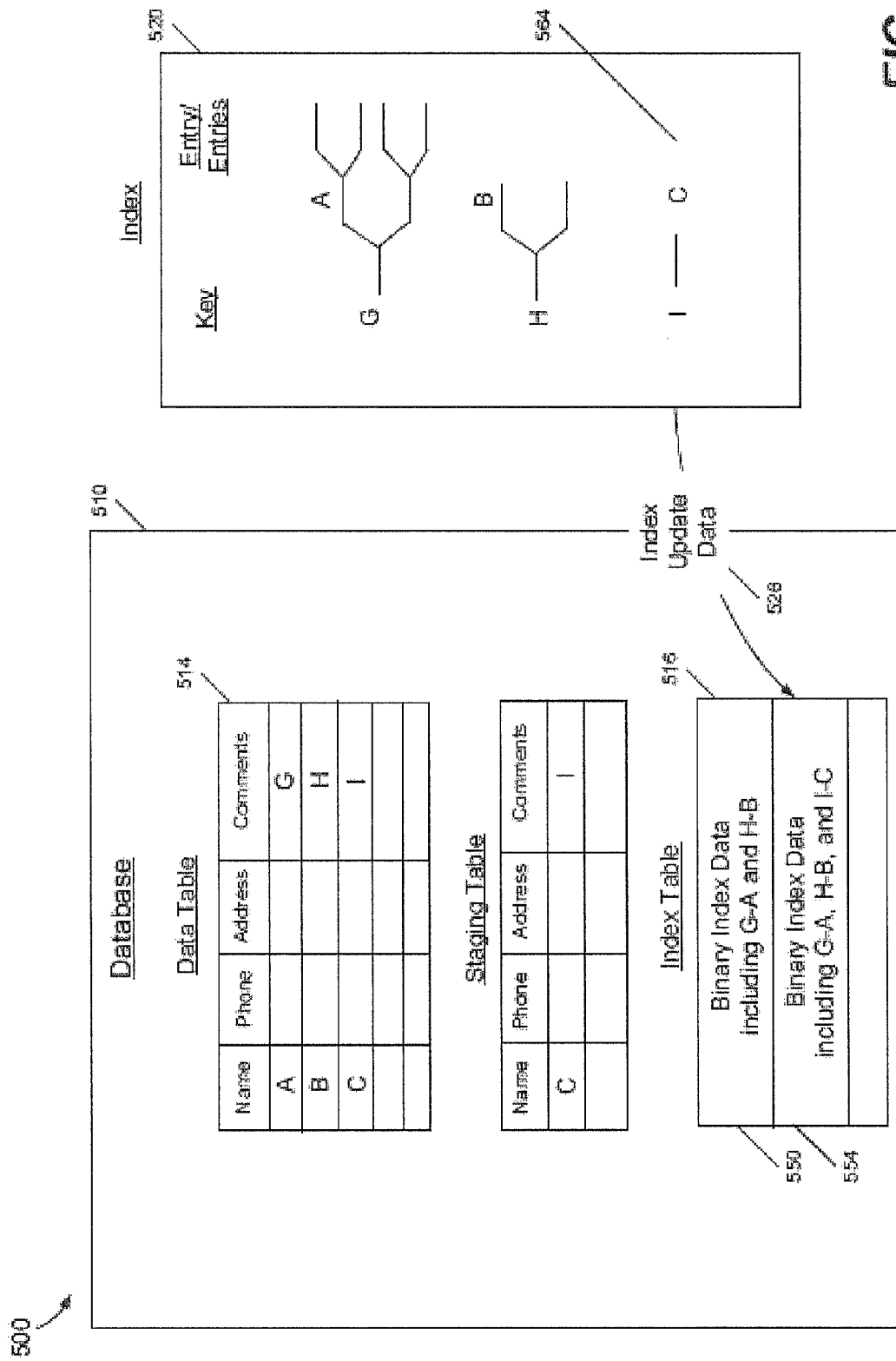
Figure 6:
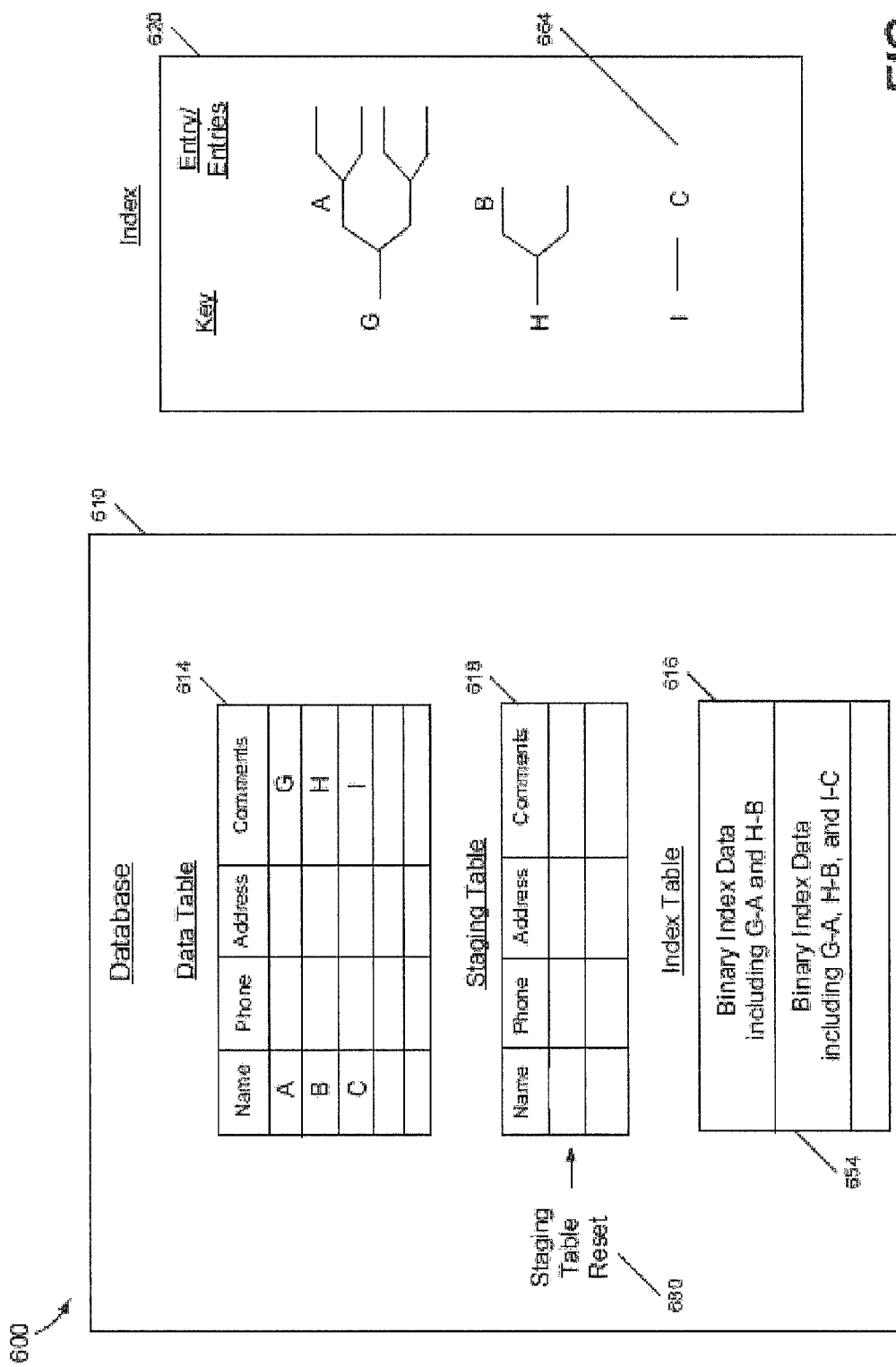

The index 320 includes data that represent a first index entry 360 for term G to name A and a second index entry 362 for term B to name H. As illustrated, the index 320 includes index structure (illustrated graphically as tree-type data structures) and index data (e.g., key and entry data). The index entries 360 and 362 were created in generating an index for the data table 314 in which terms in a comments field 324 of the data table 314 were indexed to another field, such as a name field 322. The index entries 360 and 362, for example, may have been created by the index builder 260 of the index manager 222 of FIG. 2. FIGS. 4-6 illustrate a particular embodiment showing how the application of the transaction for name C 340 results in changes to the index 320 and the index table 316.

FIG. 4 is a diagram of a system, generally designated 400, of a particular illustrative embodiment of an index 420 being updated to apply a transaction stored in a staging table 418. An entry for a transaction for name C 440, including a term I, is stored in the staging table 418 in response to an entry 434 for the transaction being applied to the data table 414. Upon occurrence of a triggering event, a triggered data update 424 is sent to an index manager (not shown) to update the index 420 with the entry 440 stored at the staging table 418. The index manager updates the index 420 to include an index entry 464 from the term I to C.

FIG. 5 is a diagram of a system, generally designated 500, of a particular illustrative embodiment of an index table 516 in a database 510 being updated to reflect a new index entry 564 in the index 520. The index manager (not shown) generates index update data 526 reflecting the new index entry 564, in this example, from term C to I. In a particular embodiment, the index update data 526 is presented in a database format used by the database 510, such as serialized binary data. The index update data 526 is applied to the index table 516 to create a new entry 554 in the index table 516 that includes term C to I. As a result, the index table 516 is updated to represent the new index entry 564 added to the index 520 to represent changes to a data table 514. As a result, the database 510 includes current versions of the data maintained in the data table 514 and index data maintained externally in the index 520 in the index table 516, as well as preceding versions of index data such as an earlier entry 550 stored in the index table 516.

Although the earlier entry 550 is illustrated as retained in the index table 516, in other embodiments the earlier entry 550 may be removed, deleted, or archived in response to receiving the new entry 554. Also, although the new entry 554 is depicted as including data representing the entire index 520 so that the index 520 may be recreated using the new entry 554 alone, in other embodiments the new entry 554 may indicate an incremental update to the index 520 and not the entire index 520, so that the index 520 may be recreated using the new entry 554 in addition to the earlier entry 550.

FIG. 6 is a diagram of a system, generally designated 600, of a particular illustrative embodiment of a database 610 after a data table 614 and an index table 616 have been updated to reflect current versions of data maintained by the database 610 and index data maintained externally in an index 620. After the index table 616 is updated to include an entry 654 that includes binary data representing a latest index entry 664 made in the index 620, a staging table 618 that previously stored data for one or more most recent transactions is cleared in a staging table reset 680. By maintaining transaction data for a transaction applied to the data table 614, as previously described with reference to FIG. 4, until the index table 616 is updated to reflect changes in the index 620 as a result of the transaction, a record of the transaction is maintained in case index update data is not received to reflect the latest index entry 664 made to the index 620. Until the index update data representing the latest index entry 664 is received and applied to the index table 616, as previously described with reference to FIG. 5, the index table 616 will not be synchronized with the index 620. Moreover, until the index update data is received, it is not known whether the index 620 has been updated to reflect the most recent transaction. Thus, maintaining transaction information in the staging table 618 enables subsequent attempts to send the transaction data to update the index 620 so that the index data maintained in the index table 616 is consistent with the index entries maintained in the index 620.

Figure 7:
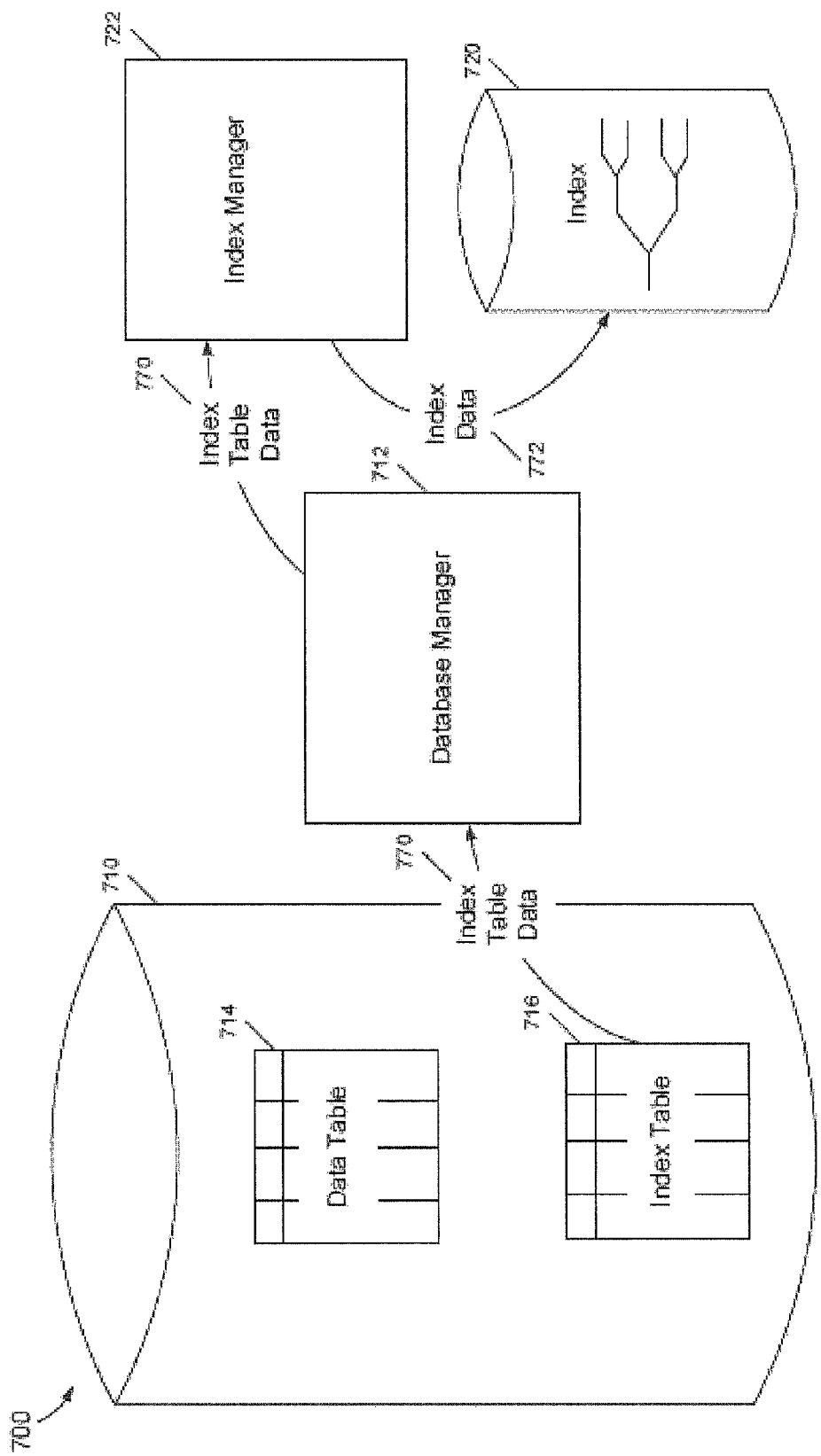
FIG. 7 is a diagram of a system for particular illustrative embodiment of a system in which index table data maintained in a database is communicated to an external index manager that uses the index table data to generate an index.

FIG. 7 is a diagram of a system for particular illustrative embodiment of a system, generally designated 700, in which index table data 770 maintained in a database 710 is communicated to an external index manager 722 that uses the index table data 770 to create an index 720. As previously described, in addition to storing data in a data table 714, the database 710 maintains a copy or master copy of data representing content of an externally-maintained index in an index table 716. The database manager 712 is responsive to retrieve the index table data 770 and to communicate the index table data 770 to the index manager 722. The index manager 722 processes the index table data 770 to generate index data 772 that is used to create the index 720. Thus, for example, if a previous manifestation of the index 720 was lost or it is desirable to generate another copy of an index, using the index table data 770 maintained in the index table 716 in the database 710, the index manager 722 can create the index 720. A request or an instruction to refresh the index 720, which may be used to create a new copy of the index 720 or to ensure that an existing copy of the index 720 is consistent with the master copy of the index 720 represented by the index table data 770 stored in the index table 716 of the database 710, may be issued by the database manager 712. In an alternative implementation, a request or instruction to recreate the index 770 may be issued by the database manager 712 or the index manager 722.

It should be noted that the index table data 770 is used to create the index 720, rather than to generate the index 720. Generating or regenerating an index 720 would involve processing data stored in the data table 714, as described with reference to FIG. 3 for example, by evaluating terms stored in a comments portion 316 or other text portions of a data table to find associations within a name portion 318 of the data table 316 to develop the index 720. By contrast, the index table data 770 maintained in the index table 716 represents content of the index 720 stored in a format used by the database 710. Thus, using the index table data 770 retrieved from the index table 716, the index 720 can be created by translating the index table data 770 from the form in which it is stored in the index table 716 into a form used by the index 720.

Figure 8:
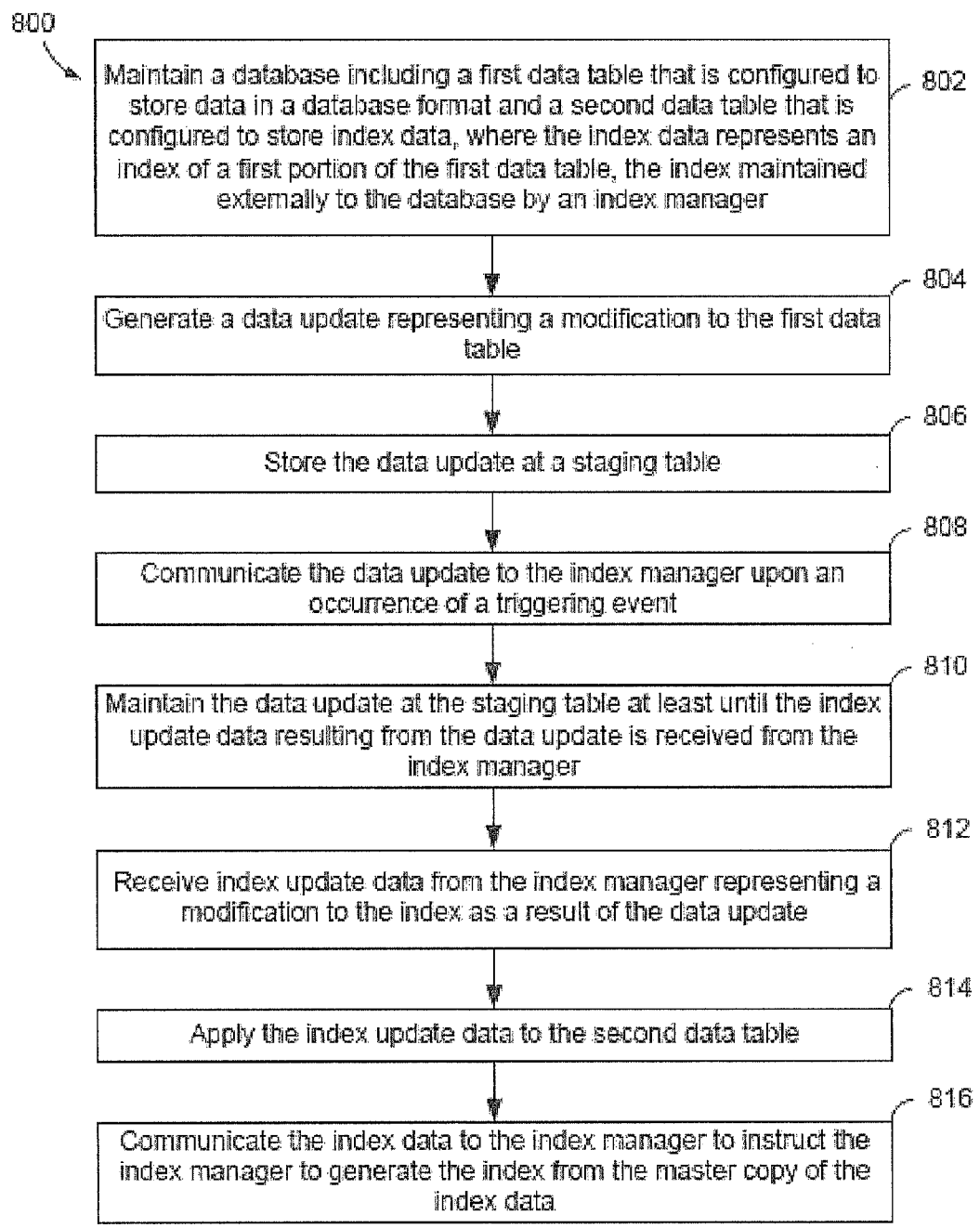
FIG. 8 is a flow chart of a particular illustrative embodiment of a method of maintaining an index table to represent content of an index in a database.

FIG. 8 is a flow chart 800 of a particular illustrative embodiment of a method of maintaining an index table to represent content of an index in a database. At 802, a database is maintained that includes a first data table that is configured to store data in a database format and a second data table that is configured to store index data, where the index data represents an index of a first portion of the first data table, the index maintained externally to the database by an index manager. For example, the database may be the database 110 of FIG. 1 maintained by the database manager 112 and that includes the index table 116 to store a master copy of data corresponding to the first index 120 maintained by the first index manager 122.

The first portion of the first data table may include text data that is indexed by the index manager. The index may be maintained by the index manager in an index format that is different from the database format. For example, the database format may include serialized binary data, and the index format may include another format to represent index data and index structures.

Moving to 804, a data update representing a modification to the first data table is generated. Proceeding to 806, the data update may be stored at a staging table. Continuing to 808, upon an occurrence of a triggering event, the data update may be communicated to the index manager. The triggering event may be a scheduled event such as a periodic or scheduled update. The data update may be applied to modify data at the first data table without regard for whether the data update has been properly processed by the index manager, as updating the first data table may not be part of the same commit scope as updating the index or storing index update data.

Moving to 810, the data update may be maintained at the staging table at least until the index update data resulting from the data update is received from the index manager. Proceeding to 812, index update data is received from the index manager representing a modification to the index as a result of the data update. The index update data may be received in the database format from the index manager.

Continuing to 814, the index update data is applied to the second data table. The second data table may include a master copy of the index data that can be used by the index manager to reproduce the index. For example, at 816, the index data may be communicated to the index manager to instruct the index manager to create the index from the master copy of the index data.

Figure 9:
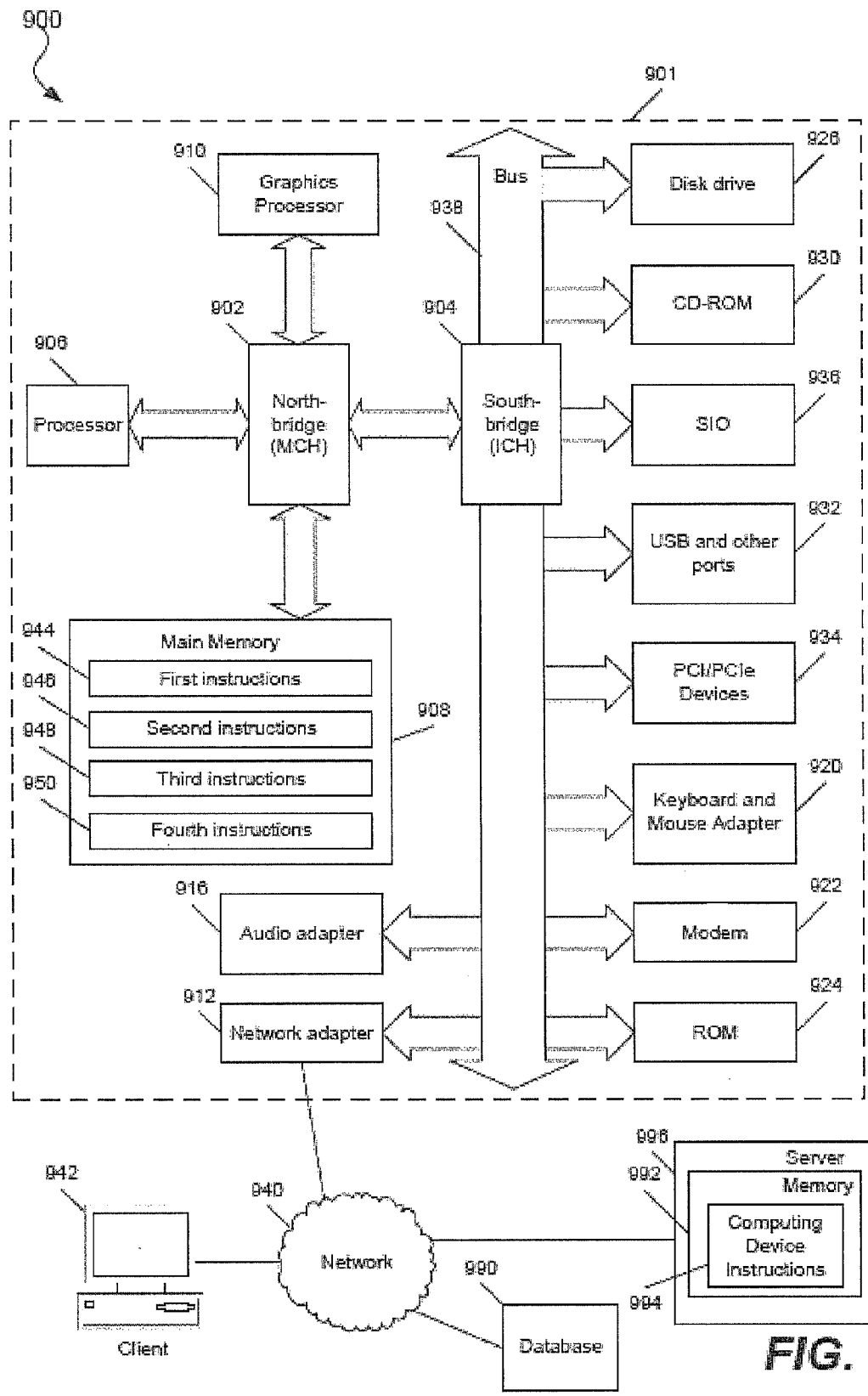
FIG. 9 is a diagram of a particular illustrative embodiment of a general-purpose computer system operable to support systems, computer program products, and methods herein described.

FIG. 9 is a diagram of one particular illustrative embodiment of a general-purpose computing system that is generally designated 900, operable to support systems, computer program products, and methods herein described. In the depicted example, the computing system 900 includes a computing device 901 that employs a hub architecture including a north bridge and memory controller hub (MCH) 902 and a south bridge and input/output (I/O) controller hub (ICH) 904. A processor 906, a main memory 908, and a graphics processor 910 are coupled to the north bridge and memory controller hub 902. For example, the graphics processor 910 may be coupled to the MCH 902 through an accelerated graphics port (AGP) (not shown).

In the depicted example, a network adapter 912 is coupled to the south bridge and I/O controller hub 904 and an audio adapter 916, a keyboard and mouse adapter 920, a modem 922, a read only memory (ROM) 924, universal serial bus (USB) ports and other communications ports 932, and Peripheral Component Interconnect (PCI) and Peripheral Component Interconnect Express (PCIe) devices 934 are coupled to the south bridge and I/O controller hub 904 via bus 938. A disk drive 926 and a CD-ROM drive 930 are coupled to the south bridge and I/O controller hub 904 through the bus 938. The PCI/PCIe devices 934 may include, for example, Ethernet adapters, add-in cards, and PC cards for notebook computers. The ROM 924 may be, for example, a flash binary input/output system (BIOS). The disk drive 926 and the CD-ROM drive 930 may use, for example, an integrated drive electronics (IDE) or serial advanced technology attachment (SATA) interface. A super I/O (SIO) device 936 may be coupled to the south bridge and I/O controller hub 904. The network adapter 912 may enable the computing device 901 to communicate with a client device 942, a database 990, and a server 996 via a network 940.

The main memory 908 includes computer instructions installed onto a computer readable medium that is accessible to the processor 906. In a particular embodiment, the computer instructions are executable to enable the system 900 to function as an index manager, such as the first index manager 122 of FIG. 1, the index manager 220 of FIG. 2, the index manager 722 of FIG. 7, or any combination thereof. The main memory 908 includes first program instructions 944 that may be executable by the processor 906 to maintain an index of text data of a table column, where the text data of the data column is maintained at a remote database, such as the database 990. The main memory 908 also includes second program instructions 946 that may be executable by the processor 906 to receive a text update reflecting a data update to the remote database 990. The main memory 908 also includes third program instructions 948 that may be executable by the processor 906 to update the index to reflect the text update.

The main memory 908 also includes fourth program instructions 950 that may be executable by the processor 906 to send index update data in a serialized binary format at a master index table in the remote database 990. In a particular embodiment, the fourth program instructions 950 further include instructions to convert index structure and index data from an index format to the serialized binary format. In a particular embodiment, the main memory 908 may further include fifth instructions (not shown) to receive the master index data from the remote database 990 and to generate a new copy of the index from the master index data.

In another embodiment, the program instructions 944-950 may cause the computing device 901 to function as a database manager, such as the database manager 112 of FIG. 1, the database manager 212 of FIG. 2, or the database manager 712 of FIG. 7, and may be implemented as a computational component for use in directing the computing device 901 to maintain a master copy of index data at a database that is indexed by an external index server, such as the database 990. The database 990 may be coupled to directly to the computing device 901 rather than via the network 940. The computational component may include encoded computing device instructions 994 emanating from a tangible computer readable medium, such as memory 992 at the server 996. The encoded computing device instructions 994 may be electronically accessible to the computing device 901 for execution. The execution of the encoded computing device instructions may cause the computing device 901 to maintain a data table in the database 990 in a database format, such the data table 114 in the database 110 of FIG. 1. The execution of the encoded computing device instructions may also cause the computing device 901 to maintain an index table in the database 990. The index table may include content of an index to the data table, such as a master copy of the index such that an index manager may be configured to generate the index from the content of the index table. The index may be maintained in a format that is different than the database format by an index manager that is external to the database 990.

The execution of the encoded computing device instructions 994 may also cause the computing device 901 to receive a transaction initiating a data update to the data table, to communicate the data update to the index manager, to receive index update data from the index manager, and to apply the index update data to the index table. The execution of the encoded computing device instructions 994 may further cause the computing device 901 to maintain a staging table for the data table, to store the data update in the staging table, to determine an occurrence of an event initiating an update to the index manager, and upon determining the occurrence of the event, to communicate the data update to the index manager. The execution of the encoded computing device instructions 994 may also cause the computing device 901 to maintain the data update in the staging table at least until the index update data is received from the index manager.

An operating system (not shown) runs on the processor 906 and coordinates and provides control of various components within the computing system 900. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on the computing system 900 (Java and all Java-based trademarks are trademarks of Sun Microsystems, Inc. in the United States, other countries, or both).

Instructions for the operating system, the object-oriented programming system, and applications or programs are located on storage devices, such as the disk drive 926, and may be loaded into the main memory 908 for execution by the processor 906. The processes of the disclosed illustrative embodiments may be performed by the processor 906 using computer implemented instructions, which may be located in a memory such as, for example, the main memory 908, the read only memory 924, or in one or more of the peripheral devices.

The hardware in computing system 900 may vary depending on the implementation. Other internal hardware or peripheral devices, such as flash memory, equivalent non-volatile memory, or optical disk drives and the like, may be used in addition to or in place of the hardware depicted in FIG. 9. Also, the processes of the disclosed illustrative embodiments may be applied to a multiprocessor data processing system.

In some illustrative examples, portions of the computing system 900 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 908 or a cache such as found in the north bridge and memory controller hub 902. A processing unit may include one or more processors or CPUs. The depicted examples in FIG. 9 and above-described examples are not meant to imply architectural limitations. For example, portions of the computing system 900 also may be implemented in a personal computer, server, server cluster, tablet computer, laptop computer, or telephone device in addition to taking the form of a PDA.

Particular embodiments of the computing system 900 can take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments in FIGS. 1-8 can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system comprising:
   a memory configured to store processor-executable instructions; and
   a processor coupled to the memory, wherein the processor is configured to execute the processor-executable instructions to:
   perform a transaction to modify at least a first data portion of a data table of a database, wherein the database comprises the data table, a staging table, and an index table, and wherein the index table is configured to store index data based on an index of the first data portion of the data table;
   based on performance of the transaction, store first data update information in the staging table, the first data update information corresponding to the transaction;
   communicate the first data update information to an index manager in response to a triggering event, wherein the index manager is at a location remote from the database and includes the index of the first data portion of the data table;
   maintain the first data update information in the staging table at least until index update data is received by the processor from the index manager;
   receive the index update data from the index manager, wherein the index update data corresponds to a modification performed on the index of the first data portion of the data table; and
   in response to the processor receiving the index update data:
      update the index data of the index table based on the index update data; and
      remove the first data update information from the staging table.

2. The system of claim 1, wherein the processor is further configured to execute the processor-executable instructions to:
   store second data update information in the staging table, the second data update information corresponding to a second transaction performed on the first data portion of the data table; and
   communicate the second data update information to the index manager, wherein the first data update information and the second data update information are communicated in a batch message to the index manager.

3. The system of claim 1, wherein the index data of the index table represents the index of the first data portion of the data table, and wherein the first data portion of the data table includes text data.

4. The system of claim 1, wherein the processor is further configured to remove the first data update information from the staging table in response to the update of the index table.

5. A method comprising:
   performing a transaction to modify at least a first data portion of a data table of a database, wherein the database comprises the data table, a staging table, and an index table, and wherein the index table is configured to store index data based on an index of the first data portion of the data table;
   based on the transaction, storing first data update information in the staging table, the first data update information corresponding to the transaction;
   communicating the first data update information to a first index manager in response to a triggering event, wherein the first index manager is at a location remote from the database and includes the index of the first data portion of the data table;
   maintaining the first data update information in the staging table at least until index update data is received from the first index manager;
   receiving the index update data from the first index manager, wherein the index update data corresponds to a modification of the index of the first data portion of the data table; and
   in response to receiving the index update data:
      updating the index data of the index table based on the index update data; and
      removing the first data update information from the staging table.

6. The method of claim 5, further comprising:
   communicating second data update information to the first index manager, wherein the second data update information is generated based on a second transaction to modify the first data portion of the data table;
   receiving an error message associated with the second data update information from the first index manager; and
   communicating a request to a second index manager to create a second index associated with the second index manager based on the index table.

7. The method of claim 5, further comprising:
   storing second data update information in the staging table, the second data update information corresponding to a second transaction performed to modify the first data portion of the data table; and
   communicating the second data update information to the first index manager, wherein the first data update information and the second data update information are communicated in a batch message to the first index manager.

8. The method of claim 5, wherein the triggering event comprises a synchronous time update cycle or an asynchronous update signal.

9. The method of claim 5, further comprising:
   storing second data update information in the staging table, wherein the second data update information corresponds to a second transaction to modify at least a second data portion of the data table; and
   maintaining the second data update information in the staging table at least until receipt of second index update data from a second index manager, wherein the second index update data corresponds to a modification of a second index associated with the second index manager.

10. The method of claim 9, further comprising removing the second data update information from the staging table in response to receiving the second index update data from the second index manager.

11. The method of claim 9, wherein the index update data is received after the communication of the first data update information and responsive to the first data update information.

12. A method comprising:
performing a transaction to modify at least a first data portion of a data table of a database, wherein the database comprises the data table, a staging table, and an index table, and wherein the index table is configured to store index data based on an index of the first data portion of the data table;
based on performing the transaction, storing first data update information in the staging table, the first data update information corresponding to the transaction;
communicating the first data update information to at least one of a first index manager or a second index manager in response to a triggering event, wherein the first index manager, the second index manager, and the database are remote from each other;
maintaining the first data update information in the staging table at least until receipt of index update data;
receiving the index update data from at least one of the first index manager or the second index manager, wherein the index update data corresponds to a modification performed on a first index of the first data portion of the data table associated with the first index manager or a second index of the first data portion of the data table associated with the second index manager; and
in response to receiving the index update data:
updating the index data of the index table based on the index update data; and
removing the first data update information from the staging table.

13. The method of claim 12, further comprising:
receiving an error message from the first index manager; and
communicating a request to the second index manager to create the second index, the second index created based on the index table.

14. The method of claim 12, further comprising:
storing second data update information in the staging table, the second data update information corresponding to a modification of at least a second data portion of the data table; and
communicating the second data update information to the second index manager.

15. The method of claim 12, wherein the triggering event is based on a synchronous time update cycle or an asynchronous update signal.

16. The method of claim 12, wherein the first data update information is communicated to the first index manager and the second index manager.

17. The method of claim 16, wherein the update of the index table is based on the first data update information.

* * * * *